United States Patent [19]

Wang

[11] Patent Number: 5,240,030
[45] Date of Patent: Aug. 31, 1993

[54] MANUAL/AUTOMATIC OPERATION INTERCHANGEABLE CONNECTING SEAT OF BALL VALVE

[75] Inventor: Chao-Jung Wang, Yun Lin Hsien, Taiwan

[73] Assignee: Century Rich Ind., Ltd., Taiepi, Taiwan

[21] Appl. No.: 2,960

[22] Filed: Jan. 11, 1993

[51] Int. Cl.$^5$ ............................................. F16K 31/00
[52] U.S. Cl. .................................... 137/269; 251/292
[58] Field of Search ................. 137/269; 251/290, 291

[56] References Cited

U.S. PATENT DOCUMENTS

| | | | |
|---|---|---|---|
| 4,046,350 | 9/1977 | Massey et al. | 137/269 X |
| 4,633,897 | 1/1987 | Effenberger | 251/291 X |
| 4,655,252 | 4/1987 | Krumhansl | 137/269 X |
| 4,699,354 | 10/1987 | Gibson et al. | 137/269 X |
| 4,719,939 | 1/1988 | Killian | 251/292 X |
| 4,887,634 | 12/1989 | Killian | 251/292 X |
| 5,098,063 | 3/1992 | Ronzon | 137/269 X |

FOREIGN PATENT DOCUMENTS 2346329 3/1975 Fed. Rep. of Germany ...... 137/269

Primary Examiner—John Rivell
Attorney, Agent, or Firm—Bacon & Thomas

[57] ABSTRACT

A manual/automatic operation interchangeable connecting seat of ball valve is disclosed. The connecting seat is formed with a central shaft hole through which a controlling lever of a ball valve body extends. Two ear sections are formed on two sides of the connecting seat. Each of the ear section has a central through hole corresponding to a connecting hole of a top flange of the ball valve body. A thread rod goes through the through hole of the ear section and the connecting hole of the top flange to secure the concectins seat on the ball valve body and seal the same. Each ear section has two wing portions on two sides thereof and each wing portion has an opening for engaging a driver with the connecting seat in automatic operation mode of the ball valve, whereby the controlling lever can be associated with a grip in manual operation mode of the ball valve or alternatively associated with a driver to change the manual operation mode into automatic operation mode of the ball valve.

3 Claims, 6 Drawing Sheets

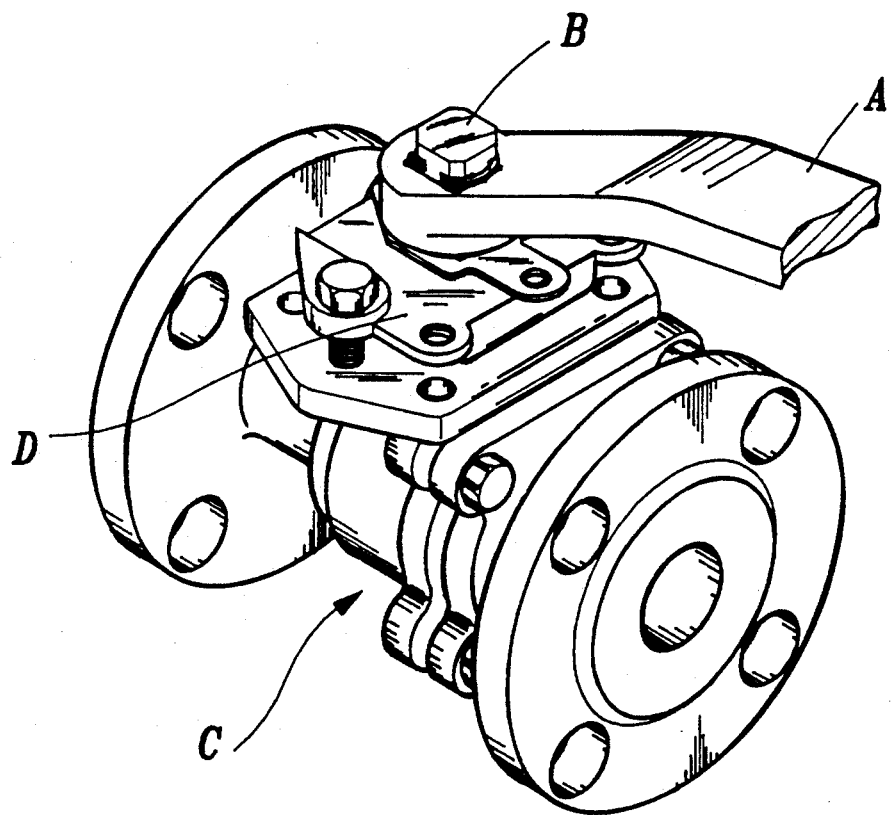
FIG. 4 *Prior Art*

FIG. 5  *Prior Art*
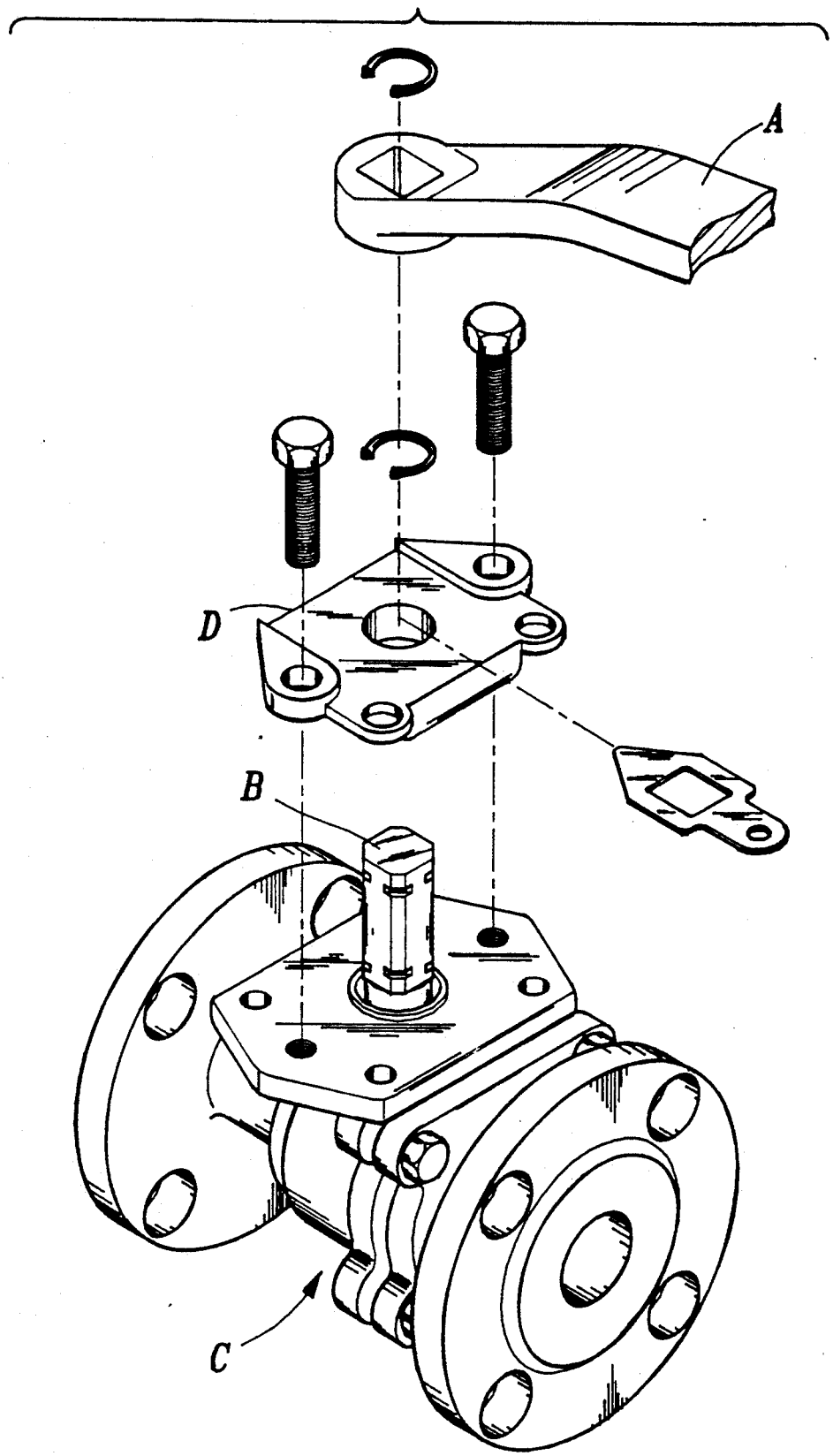

FIG. 6 <u>Prior Art</u>
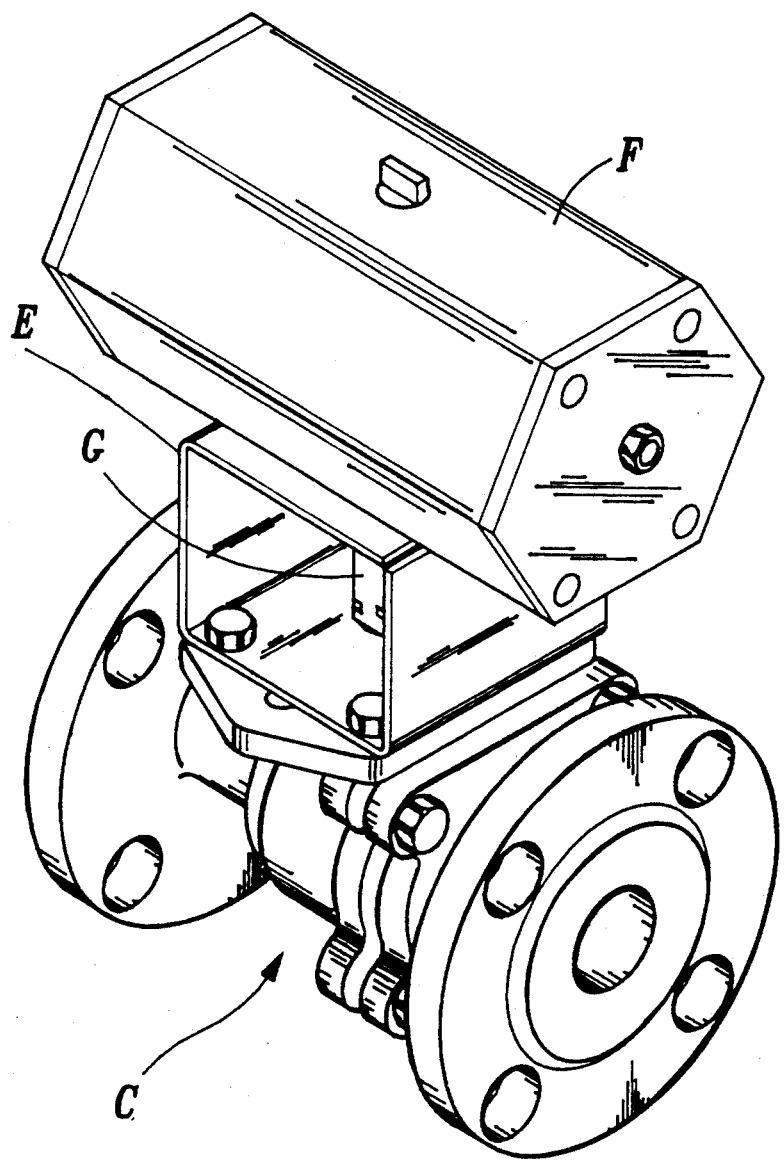

MANUAL/AUTOMATIC OPERATION INTERCHANGEABLE CONNECTING SEAT OF BALL VALVE

BACKGROUND OF THE INVENTION

The present invention relates to a connecting seat of manual/automatic operation interchangeable ball valve, and more particularly to a connecting seat of ball valve, which permits the ball valve to be directly changed from manual operation mode into automatic operation mode without additionally processing and reassembling the parts or closing the circuit.

A conventional ball valve is designed as shown in FIGS. 4 to 6, wherein a grip A is secured to a controlling lever B which extends downward into a ball valve body C. When the grip A is manually rotated, the controlling lever B is rotarily driven in order to control the opening/closing of the ball valve. A sealing cover D is disposed between the controlling lever B and the ball valve body C to achieve a sealed state therebetween. When the ball valve is to be changed from a manual operation mode to an electrical or pneumatic operation mode, with pneumatic operation exemplified below, as shown in FIGS. 5 and 6, the circuit must be first closed and then the grip A and sealing cover D must be disassembled. Thereafter, another sealing cover is newly installed and a valve support E is additionally mounted. A pneumatic driver F is then secured on the valve seat E. Meanwhile, because the length of the controlling lever B becomes insufficient due to the mounting of the valve support E, an additional connecting member G must be disposed between the controlling lever B and the pneumatic driver F so that the driver F can drive the controlling lever B. It can be obviously seen from the above that when a conventional ball valve is changed from manual operation into automatic operation, the circuit must be first closed and many additional elements must be prepared. Moreover, the top flange of the ball valve body must be disposed with thread holes for mounting the valve support E thereon. As a result, the parts are increased, the assembling/disassembling procedure is complicated and the cost is inevitably raised. Moreover, the additional valve support E will increase the occupied room and cause trouble during installation of the ball valve in a limited space.

It is therefore tried by the applicant to develop a connecting seat of manual/automatic operation interchangeable ball valve, wherein when the ball valve is changed from manual operation into automatic operation, the user only needs to detach the grip from the controlling lever and instead secure an electrical of a pneumatic driver thereto directly and conveniently.

SUMMARY OF THE INVENTION

It is therefore a primary object of this invention to provide a connecting seat of manual/automatic operation interchangeable ball valve, which is formed with a central shaft hole for a controlling lever of the ball valve to extend therethrough. Two ear sections symmetrically extend outward from the two sides of the connecting seat. Each of the ear section has a central through hole for a thread rod to go therethrough and secure the connecting seat on the ball valve body. Each ear section further has two wing portions each of which has an opening for engaging an electrical or a pneumatic driver with the connecting seat, whereby in manual operation mode, a grip is associated with the controlling lever while when the ball valve is changed from manual operation mode into automatic operation mode, the grip can be detached from the controlling lever with the driver secured thereto instead directly by means of the openings of the wing portions thereof. Reversely, if the ball valve is changed from the automatic operation into manual operation, the driver can be replaced with the grip. Such changing procedure is very easy while the circuit does not need to be closed during the changing procedure. Therefore, the cost is lowered and the practicality is increased.

The present invention can be best understood through the following description and accompanying drawings wherein:

BRIEF DESCRIPTION OF THE DRAWINGS

FIG. 4 is a perspective assembled view of a conventional manually operated ball valve;

FIG. 5 is a perspective exploded view according to FIG. 4; and

FIG. 6 is a perspective view showing that a pneumatic driver is conventionally secured on the ball valve in automatic operation mode.

DETAILED DESCRIPTION OF THE PREFERRED EMBODIMENT

Figure 1:
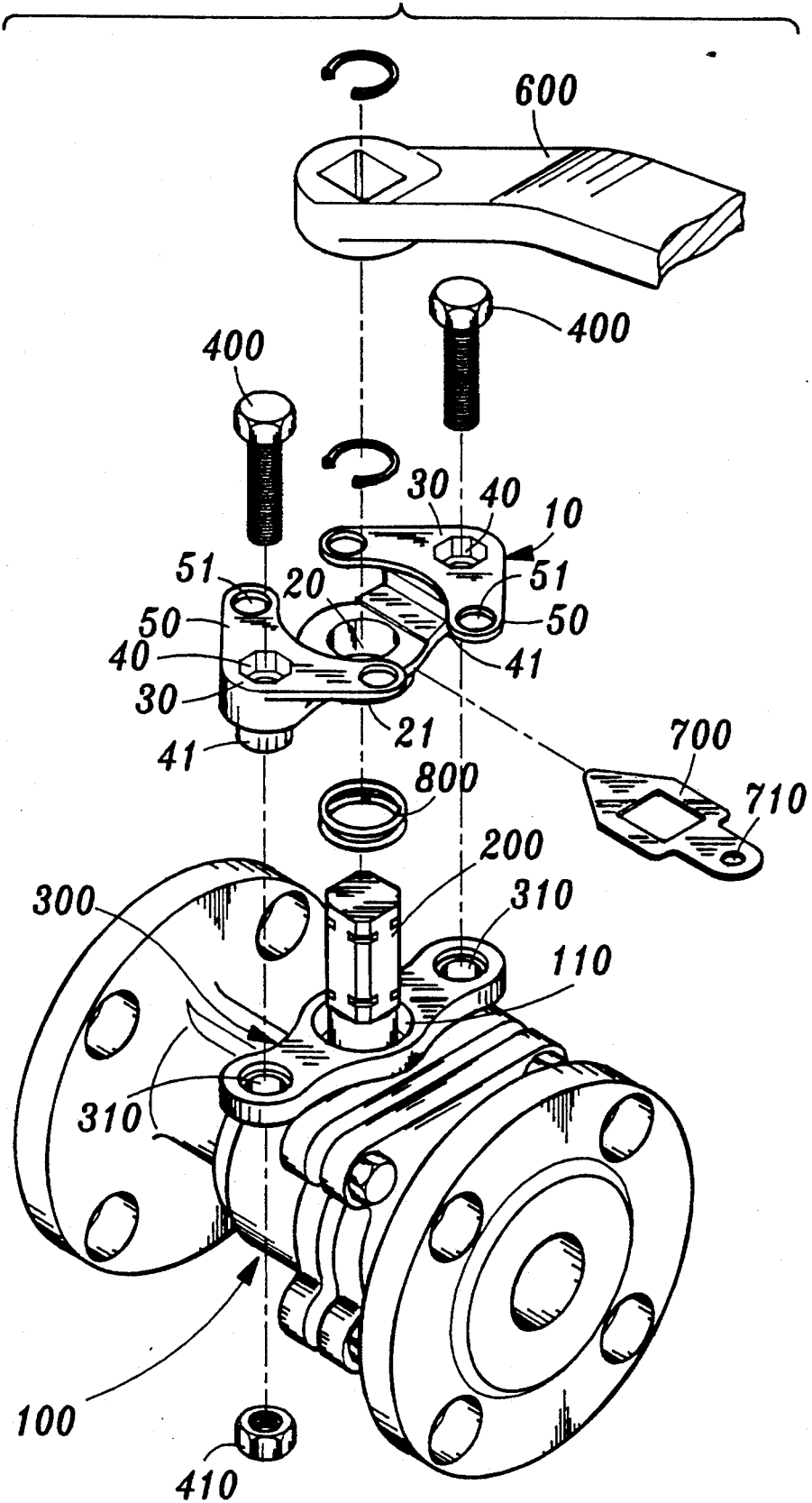
FIG. 1 is a perspective exploded view of this invention in a manual operation mode.

Please first refer to FIG. 1. The internal structure of the ball valve body 100 of this invention is similar to that of a conventional ball valve and will not be described hereinafter. The ball valve body 100 has a shaft hole 110 for a controlling lever 200 to extend outside the ball valve body 100 in order to control the opening/closing thereof. A connecting seat 10 is disposed between the ball valve body 100 and the controlling lever 200. The controlling lever 200 goes through the connecting seat 10 to achieve a sealing effect. A pair of top flanges 300 extends from the upper portion of the ball valve body 100. Each top flange 300 has a stepped connecting hole 310 engaged with the connecting seat 10. A locking plate 700 is mounted on the controlling lever 200 and is movable along therewith like the arrangement of the conventional ball valve.

Figure 2:
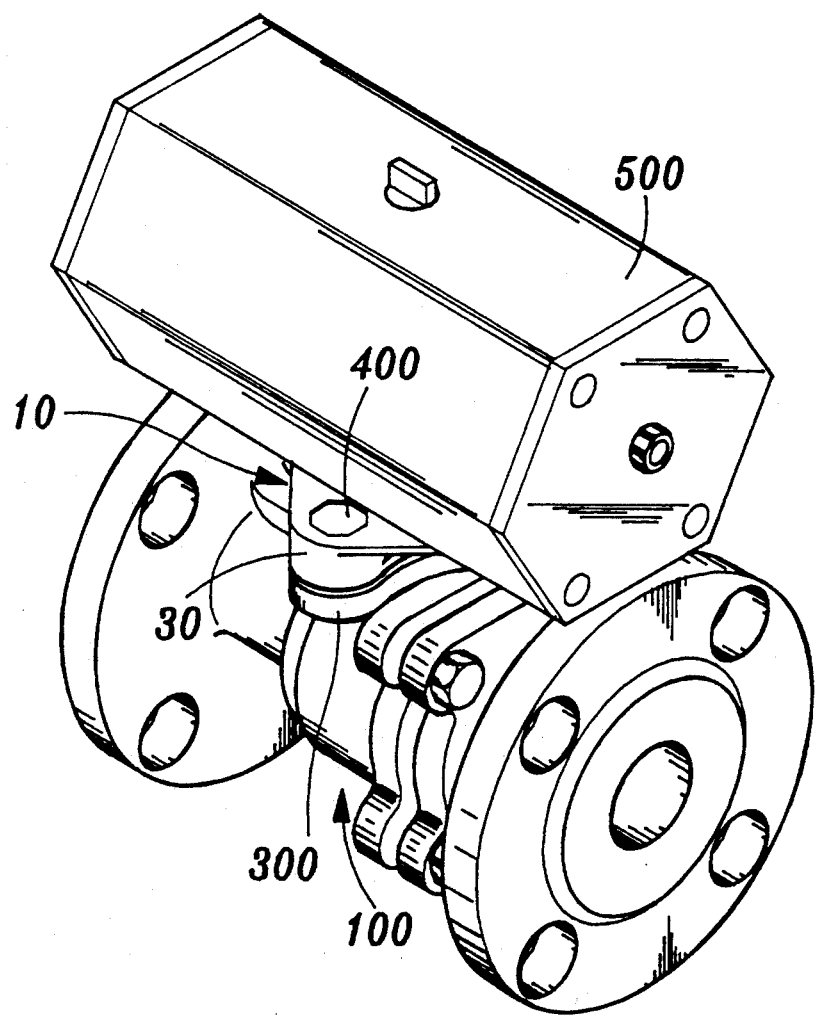
FIG. 2 is a perspective assembled view of this invention, wherein a pneumatic driver is provided in automatic operation mode.
Figure 3:
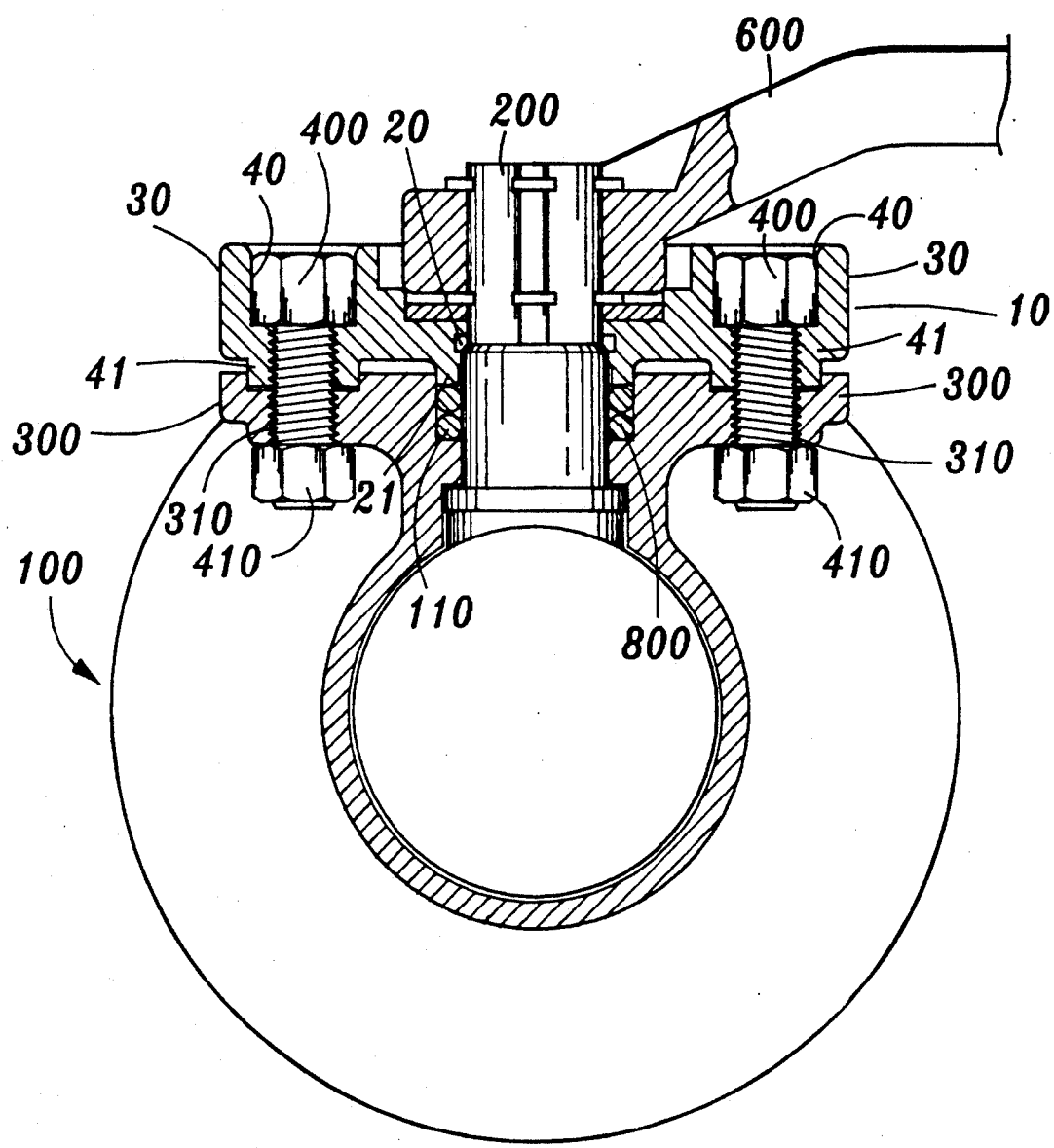
FIG. 3 is a sectional view showing that a manually driven grip is secured to the connecting seat.

As shown in FIGS. 1 to 3, the connecting seat 10 has a central shaft hole 20 for the controlling lever 200 to go therethrough, and two ear sections 30 extending outward from two sides of the connecting seat 10. Each ear section 30 has a central through hole 40 corresponding to the connecting hole 310 of the top flange 300, whereby a thread rod 400 can go through the through hole 40 and the connecting seat hole 310 and secure the connecting seat 10 on the top flange 300. Preferably, the thread rod 400 has a hexagonal head and the through hole 40 has a correspondingly hexagonal portion for receiving the hexagonal head of the thread rod 400. Two sides of the ear section 30 are formed with the wing portions 50 each of which has an opening 51. The opening 51 not only can cooperate with the circular hole 710 of the locking plate 700 for securing the same but also can associate with an electrical or pneumatic driver 500 as described below. The central shaft hole 20 of the connecting seat 10, the through holes 40 of the ear sections 30, the connecting holes 310 of the top flange 300 and the shaft hole 110 of the ball valve body 100 are all stepped holes. Moreover, extensions 21, 41 respectively extend downwardly from the through holes 40 of the ear sections 30 and the central shaft hole 20 of the connecting seat 10 into the connecting holes 310 and shaft hole 110. The extension 21 tightly abuts against a washer 800 around the controlling lever 200 to achieve an excellent sealing effect of the ball valve.

When the ball valve 100 is operated manually, a grip 600 is engaged with the controlling lever 200 as shown in FIG. 1. However, when the ball valve 100 is to be alternatively automatically operated, the grip 600 is removed as shown in FIG. 2 and an electrical or a pneumatic driver 500 is directly associated with the controlling lever 200 by means of the openings 51 of the wing portions 50 of the connecting seat 10. It should be noted that the positions of the openings 51 are designed in conformity with the specification of ISO (International Organization for Standardization) NO. 5211 so as to facilitate the installation of the driver. Therefore, the change of operation of the ball valve from a manual mode to an automatic mode can be performed very easily and vice versa. Furthermore, because the connecting seat 10 is not necessary to be detached in the change procedure, the sealing effect of the connecting seat 10 with respect to the ball valve body 100 will not be affected and thus the circuit does not need to be closed in the change procedure. In addition, such a change procedure is very simple and no additional element is required therein so that the cost is decreased and the volume of the assembly is greatly reduced.

Moreover, the through hole 40 of the ear section 30 of the connecting seat 10 can be stepped holes as shown in FIG. 3 so that when the thread rod 400 is extended into the through hole 40, the head of the thread rod 400 is imbedded in the through hole 40 so as to reduce the room occupied by the thread rod 400 and avoid forming any obstacle to the assembling operation. If a slight lead occurs from the washer 800 after a long period of use, a user only needs to further tighten a nut 410 without disassembling the driver. Such operation is very convenient.

In conclusion, the present invention possesses at least the following advantages:

(1) the change from manual operation to automatic operation is very easy;

(2) no additional element is required;

(3) no additional valve support is required and thus the occupied room is reduced;

(4) the cost to the manufacturer and the user is considerably decreased; and (5) the circuit does not need to be closed in change procedure.

According to the above arrangement and advantages of this invention, the drawbacks of the prior art have been eliminated and advantageous effects have been achieved by this invention.

What is claimed is:

1. A connecting seat of manual/automatic operation interchangeable ball valve, said connecting seat being secured on a top flange of a ball valve body, said ball valve body having a controlling lever extending through said connecting seat, said connecting seat being characterized by a central shaft hole through which said controlling lever extends and a pair of ear sections extending outward from two sides of said connecting seat, each of said ear sections having a through hole corresponding to a connecting hole of said top flange whereby a thread rod can go through said through hole and connecting hole to secure said connecting seat on said top flange, each ear section having two wing portions on two sides thereof, each wing portion having an opening for engaging a driver with said connecting seat in automatic operation of said ball valve, whereby a grip or said driver can be alternatively associated with said connecting seat to interchange manual operation mode and automatic operation mode of said ball valve.

2. A connecting seat as claimed in claim 1 wherein said through hole of said ear section of said connecting seat is a stepped hole with an upper hexagonal recess and said thread rod has a hexagonal head suitable to be embedded in said upper hexagonal recess.

3. A connecting seat as claimed in claim 1, further comprising three extensions extending downwardly from the lower portions of said central shaft hole of said connecting seat and said through holes of said ear sections of said connecting seat, said extensions fitting respectively into a shaft hole of said ball valve body and said connecting holes of said top flange.

* * * * *